(12) United States Patent
Maeda

(10) Patent No.: US 6,885,018 B2
(45) Date of Patent: Apr. 26, 2005

(54) REEL ROTATION AND OPTICAL DETECTION MECHANISM FOR VIDEO CASSETTE DECK

(75) Inventor: Osamu Maeda, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 09/111,578

(22) Filed: Jul. 8, 1998

(65) Prior Publication Data

US 2002/0003205 A1 Jan. 10, 2002

(30) Foreign Application Priority Data

Jul. 9, 1997 (JP) ......................................... 9-005969 U

(51) Int. Cl.[7] .............................................. G01N 21/86
(52) U.S. Cl. .............................. 250/559.29; 360/74.6; 242/333.2
(58) Field of Search ............................. 250/221, 227.4, 250/227.28, 231.13, 570, 559.12, 559.29; 360/74.6, 132; 242/333, 333.1, 333.2

(56) References Cited

U.S. PATENT DOCUMENTS 3,619,625 A * 11/1971 Wood .................... 250/559.29
5,311,030 A * 5/1994 Higuchi et al. ........ 250/559.29

* cited by examiner

*Primary Examiner*—Thanh X. Luu
(74) *Attorney, Agent, or Firm*—Myron Greenspan, Esq.; Lackenbach Siegel LLP

(57) ABSTRACT

An object of this invention is to reduce the manufacturing cost by simplifying a reel rotation detecting mechanism in a video cassette deck. A light emitting element and a light receiving element are engaged on a main substrate provide under a deck chassis. On the deck chassis is mounted a light guiding member that includes a pillar portion extending through the deck chassis and a branch portion extending sideways from the pillar portion. In order to detect the leading ends and trailing ends of the magnetic tape, the pillar portion guides the light coming from the light emitting element into the cassette arranged on the deck. The branch portion, above the deck chassis, guides one portion of the light incident to the pillar portion to the reel on the deck chassis. The rotation of the reel is detected by receiving the light by the light receiving element on the main substrate through the opening point provided in the reel and the opening provided in the deck chassis.

22 Claims, 5 Drawing Sheets

Prior Art

Prior Art

PRIOR ART

REEL ROTATION AND OPTICAL DETECTION MECHANISM FOR VIDEO CASSETTE DECK

BACKGROUND OF THE INVENTION

1. Field of the Invention

The present invention relates to a reel detecting mechanism for optically detecting the reel rotation in a video cassette deck.

2. Description of Prior Art

In video cassette decks, an optical leading end and entraining end detecting mechanism is used so as to detect the leading end and the entraining end of the magnetic tape within a cassette set within the deck. The rotation of the reel is often detected optically by the common use of the leading and entraining end detecting mechanism and partial components. A reel detecting mechanism for commonly using the leading and entraining end detecting mechanism such as magnetic tape and its partial components are described in, for example, Japanese Patent Application Laid-Open No. 8-17095 and Japanese Application Laid-Open No. 129794.

FIG. 2 is a schematic plan view of a reel rotation and detection mechanism described in Japanese Patent Application Laid-Open No. 8-17095. Magnetic head cylinder, reels 10a, 10b and so on which are the major components of the video cassette deck are mounted on a deck chassis 20.

The reel rotation and detection mechanism has a light emitting element 41 provided above the deck chassis 20. The light emitting element 41 emits the light in two directions from the common use relationship between the leading end and entraining end detecting mechanism of the magnetic tape to be described later. One light to be emitted from the light emitting element 41 is divided into two directions by the light guiding member 52 for reel rotation and detection use and is guided to the light receiving elements 51a and 51b by way of the light transmitting portions 54a and 54b provided in the reel 10a and 10b. The light transmitting portions 54a and 54b are formed in the cylindrical portion provided in the lower portions of the reels 10a and 10b, while the light receiving elements 51a and 51b are provided, above the deck chassis 20, on the inner side of the cylindrical portion.

The leading and entraining end detecting mechanism of the magnetic tape 1 divides the other light transmitted from the light emitting element 41 by a light guiding member 43 for the leading and entraining end detection use, so as to guide the light in the light receiving elements 42a and 42b by way of within the cassette 2. The light receiving elements 42a and 42b, together with the light emitting element 41 and the light receiving elements 51a and 51b for rotation detecting use, are provided above the deck chassis 20.

In this manner, the reel rotation and detection mechanism described in Japanese Patent Application Laid-Open No. 8-17095 commonly uses the light emitting element 41 between the leading and entraining end detecting mechanism of the magnetic tape 1.

FIG. 3 is a schematic elevation view of the reel rotation and detection mechanism described in Japanese Patent Application Laid-Open No. 8-129794. The reel rotation and detection mechanism is different in the common use of the light emitting element 41 and the light guiding member 52 between the the leading and entraining end detecting mechanism of the magnetic tape. The light emitting element 41 is engaged on the main substrate 30 provided under the deck chassis 20. The light receiving element 51 for reel rotation and detection use is provided on the chassis 20 through a housing 31, because it is not engaged directly on the main substrate 30 from the relation of the position on the inner side of the cylindrical portion 12 provided in the lower portion of the reel 10 although it is provided on the main substrate 30.

The reel rotation and detection mechanism is economical in that one portion of the components is commonly used between the leading end and entraining end detecting mechanism of the magnetic tape. Since the light receiving element 51 and further, the light receiving elements 42a and 42b for the leading end and the entraining end detecting use are positioned above the deck chassis 20 and are separated from the main substrate 30, whereby the wiring configuration and so on become complicated. Thus, a type is developed, wherein these light receiving elements, together with the light emitting element are positioned under the deck chassis 20, and are engaged directly on the main substrate 30.

SUMMARY OF THE INVENTION

FIG. 4 and FIG. 5 are configuration illustrating diagrams of a type with the light emitting element and the light receiving element being directly engaged on the substrate, FIG. 4 showing a leading and entraining end detecting mechanism of a magnetic tape and FIG. 5 showing a reel rotation and detection mechanism using one portion of the leading and entraining end detecting mechanism.

As shown in FIG. 4, the leading end and entraining end detecting mechanism 40 of the magnetic tape is composed of a light emitting element 41 engaged on the main substrate 30 of the video cassette deck, a pair of light receiving elements 42a and 42b engaged on the main substrate 30 with the light emitting element 41 being arranged between them, a light conducting member 43 mounted on the deck chassis 20, and a pair of reflection plates 44a and 44b mounted on the deck chassis 20 with the light guiding member 43 being arranged between them.

The light conducting member 43 is a prism having a pillar portion 43a extending through the deck chassis 20, and a branch portion 43b extending obliquely and downwardly from the lower end portion of the pillar portion 43a. The pillar portion 43a divides the light incident from the light emitting element 41 with the tip end portion, so as to guide the light to the reflection plates 44a and 44b on both the sides. The branch portion 43b is positioned under the deck chassis 20 for the rotation and the detection of the reel 10 to be described later, so as to guide sideways one portion of the light which is incident from the light emitting element 41.

When the cassette is set in the video cassette deck, the pillar portion 43a of the light guiding member 43 is inserted into the concave portion provided in the under face of the cassette. When the light emitting element 41 is activated in this condition, the light passes through the pillar portion 43a of the light guiding member 43 and divides onto both the sides.

When the magnetic tape within the cassette is in the leading end portion, one of the light portions divided on both the sides by the tip end portion of the light conducting member 43 passes the transmission portion on the leading end side of the magnetic tape and the light is directed to one light receiving element 42a by way of one reflection plate 44a. As the other light is screened by a magnetically coated portion of the magnetic tape, it does not reach to the other light receiving element 42b. Thus, the leading end of the magnetic tape is detected.

When the magnetic tape within the cassette is in the entraining end portion, one of the light portions divided onto both the sides by the tip end portion of the light guiding member 43 is screened with the magnetically coated portion of the magnetic tape, whereby the light does not reach one light receiving element 42a. The other light transmits the transmitting portion on the entraining end side of the magnetic tape, and the light is directed to the other light receiving element 42b by way of the other reflection plate 44b.

As shown in FIG. 5, the conventional reel rotation and detection mechanism 50 using one portion of the leading and entraining end detecting mechanism 40 of the magnetic tape is composed of the aforementioned light emitting element 41 engaged on the main substrate 30, a specific light receiving element 51 for rotation and detection engaged on the main substrate 30, the aforementioned light guiding member 43 mounted on the deck chassis 20, a specific light guiding member 52 for rotation and detection on the under face of the deck chassis 20, a sensor gear 53 and so on.

The specific light guiding member 52 for rotation and detection use is a prism for guiding, to the light receiving element 51, the light coming from the branch portion 43b of the light guiding member 43. The sensor gear 53 is rotationed in synchronous relation with the reel 10 by interlocking with the reel 10 through the intermediate gear 55. The light screening portions 53a and 53a are provided in two positions in the peripheral direction of the sensor gear 53. The light screening portions 53a and 53a are to cross the light path reaching from the branch portion 43b of the light guiding member 43 to the light guiding member 52 through the rotation of the sensor gear 53.

The specific light guiding member 52 for rotation and detection use is a prism for guiding, to the light receiving light element 51, the light coming from the branch portion 43b of the light guiding member 43. The sensor gear 53 is rotated in synchronous relation with the reel 10 by interlocking with the reel 10 through the intermediate gear 54. The light screening portions 53a and 53a are provided in two positions in the peripheral direction of the sensor gear 53. The light screening portions 53a and 53a are to cross the light path reaching from the branch portion 43b of the light guiding member 43 to the light guiding member 52 through the rotation of the sensor gear 53.

The light, incident into the light guiding member 43 from the light emitting element 41, is divided for the branch 43b. The light is guided to the light receiving element 51 through the light guiding member 52. The rotation of the reel 10 is detected, because the light screening portions 53a and 53a are to cross the light path reaching the light guiding member 52 from the branch portion 43b through the rotation of the sensor gear 53.

Since the conventional reel rotation and detection mechanism 50 detects the rotation of the reel 10 with the common use of partial components (the light emitting element 41 and the light guiding member 43) between the leading and entraining end detecting mechanism 40 of the magnetic tape, the conduction is simple and economical. Further, the light emitting element 41 and the light receiving element 51 are simple in construction and economical in that they are directly engaged on the main substrate 30.

Since the light receiving element 51 is directly engaged on the main substrate 30 lower than the deck chassis 20, the light guiding member 52 and the sensor gear 53, further, specific components such as intermediate gear 55 or the like are used, thus retaining many components. Thus the manufacturing cost of the reel rotation and detection mechanism 50, and the video cassett deck cannot be lowered sufficiently.

Accordingly, an object of this invention is to provide a reel rotation and detection mechanism of in cassette deck which is considerably simpler in construction and economical despite the provision of the light emitting element and the light receiving element under the deck chassis.

DETAILED DESCRIPTION OF PREFERRED EMBODIMENTS

Figure 1:
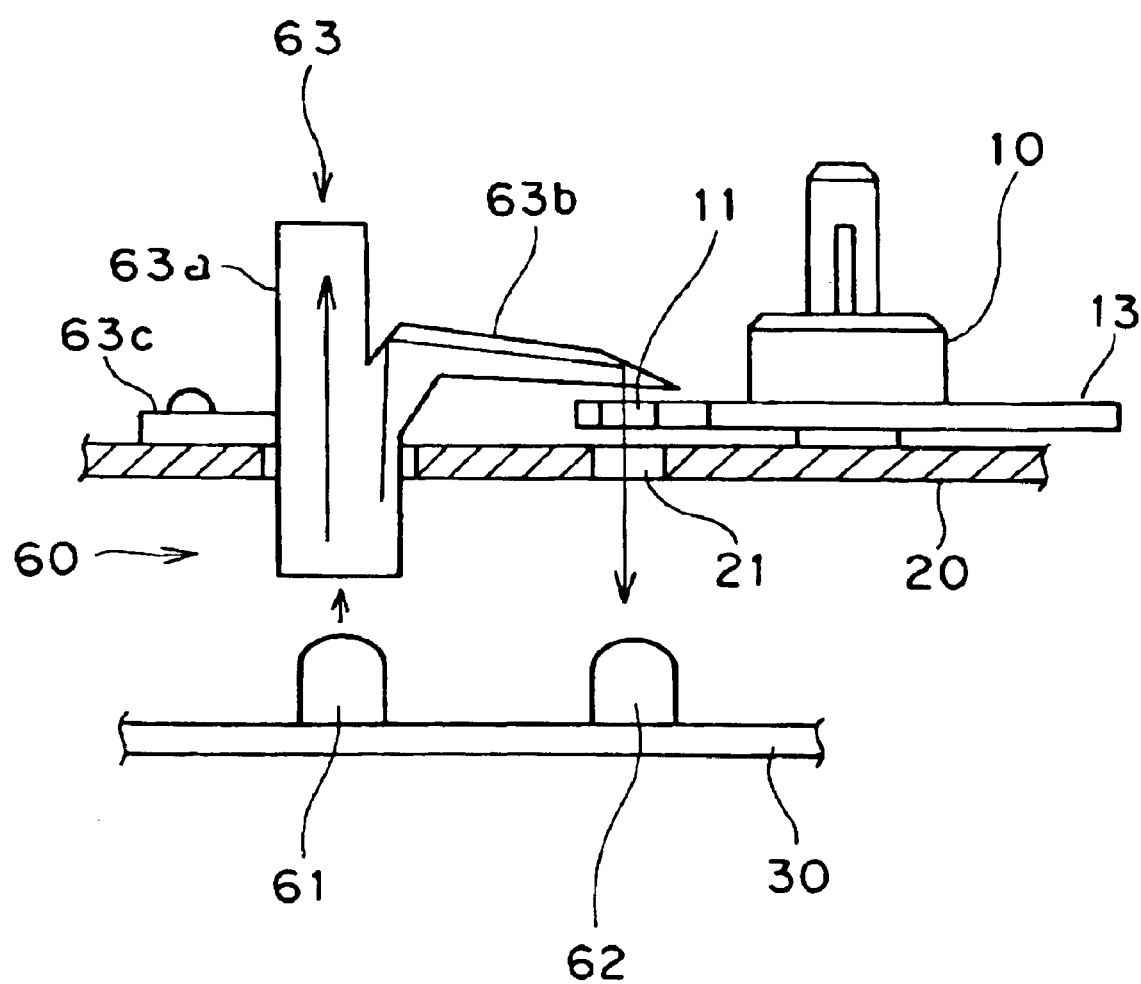
FIG. 1 is a schematic configuration and elevational view of a reel rotation and detection mechanism in accordance with the invention.
Figure 2:
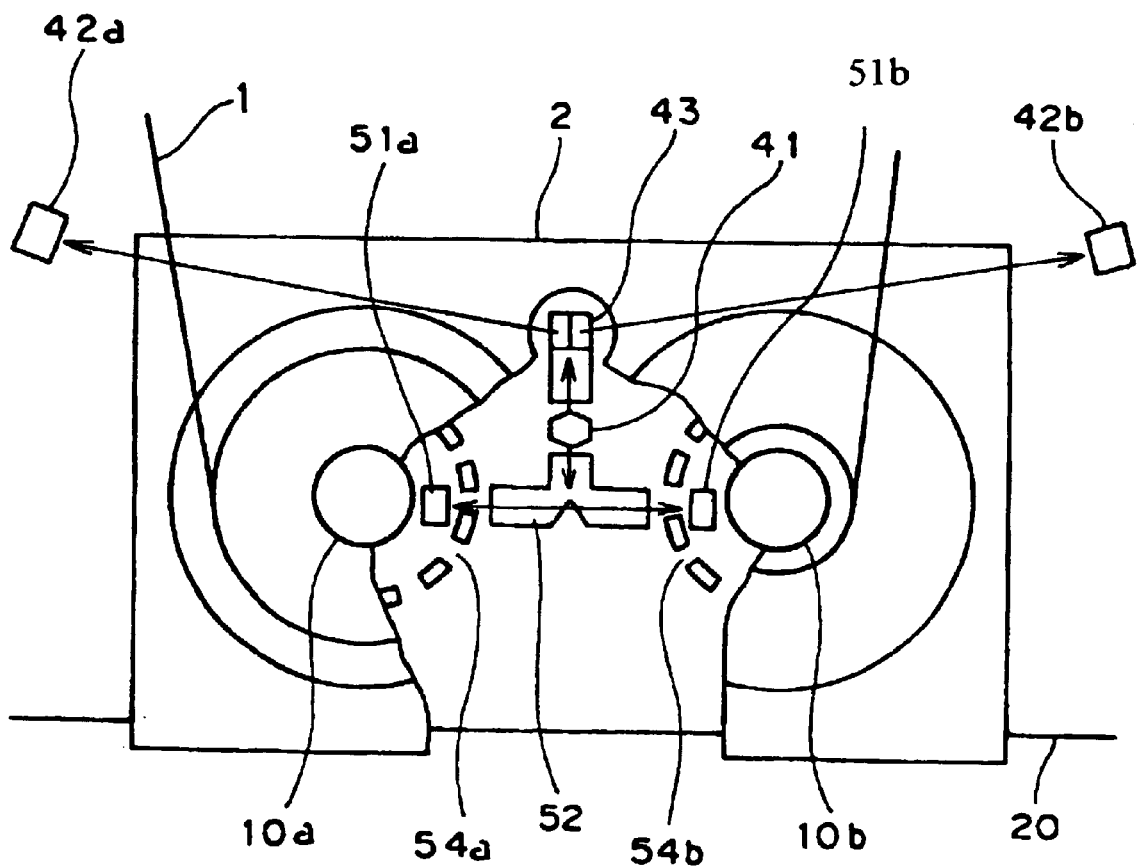
FIG. 2 is a schematic construction and plan view of a conventional reel rotation and detection mechanism in accordance with the invention for using one portion of the leading and entraining end detection mechanism of the magnetic.
Figure 3:
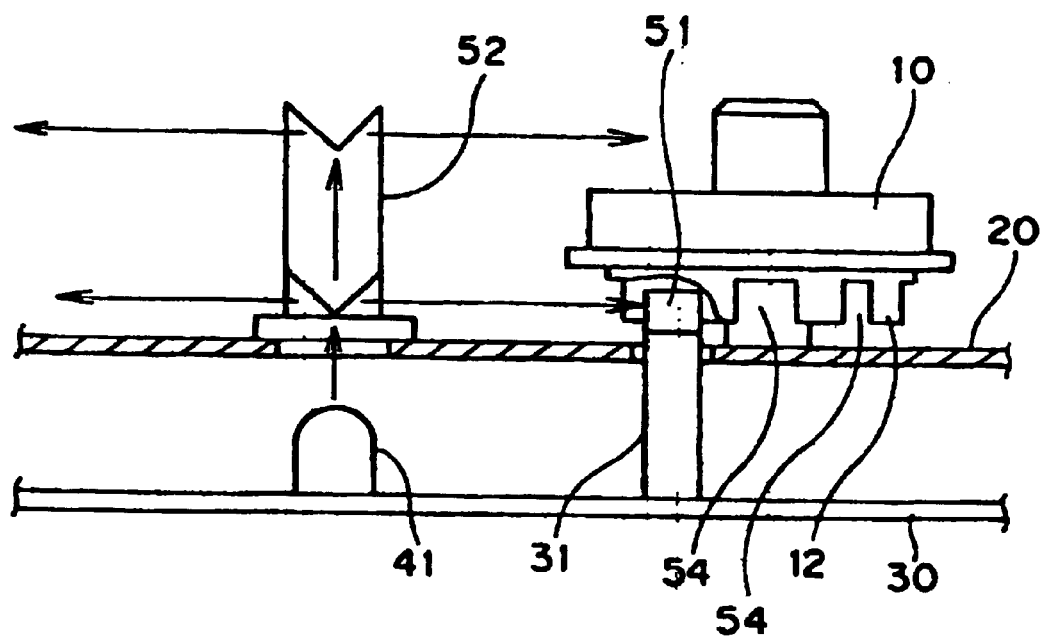
FIG. 3 is a schematic construction and elevational view of another conventional reel rotation and detection mechanism using one portion of the leading and entraining end mechanism of the magnetic tape.

A reel rotation and detection mechanism for a video cassette deck comprises a light emitting element for conducting the leading and entraining end detection of the magnetic tape within a cassette set within the video cassette deck, a light guiding member for guiding the light from the light emitting element into the cassette for conducting the leading and entraining detection of the magnetic tape, and directly conducting onto the reel side for conducting the rotation and detection of the light, a light receiving element for receiving the light conducted onto the side of the reel, a light passing portion or a light screening portion provided on the reel so as to cross the light path reaching from the light guiding member to the light receiving element through the rotation of the reel. It is characterized in that the light emitting element and the light receiving element are provided under the deck chassis for mounting main components including the reel of the video cassette deck, and the light guiding member guides the light coming from the light emitting element to the light receiving element under the chassis by way of the light transmission portion or the light screening portion provided on the reel on the deck chassis.

In the reel rotation and detection mechanism for the video cassette deck of this invention, the deck chassis has a transmitting opening portion for passing the light the light downwards from above.

In the reel rotation and detection mechanism for the video cassette deck of this invention, the light guiding member has a pillar portion extending through the deck chassis to guide the light, coming from the light emitting element, into the cassette on the deck chassis, and a branch portion extending sideways from the pillar portion to illuminate the light to the light receiving element, the branch portion being positioned above the deck chassis and opposite to the light passing portion or the light screening portion provided in the reel on the deck chassis.

In the reel rotation and detection mechanism of the video cassette deck according to this invention, the light passing portion or the light screening portion is provided in the disk portion provided integrally on the reel, and the branch portion is opposite from above to the light passing portion or the light screening portion.

In the reel rotation and detection mechanism of the video cassette deck according to this invention, the light emitting element and the light receiving element are engaged on the substrate provided under the deck chassis.

In the reel rotation and detection mechanism of the video cassette deck according to this invention, the light receiving element for leading and entraining end detecting use for receiving the light guided into the cassette to detect the leading and entraining end of the magnetic tape is provided under the deck chassis, and a reflection plate for reflecting the light downwards from above the deck chassis is provided above the deck chassis.

In the reel rotation and detection mechanism of the video cassette deck according to this invention, a light receiving element for detecting the leading and entraining ends, together with the light emitting element and the light receiving element, are engaged with on the substrate under the deck chassis.

In such a configuration, the light from the light emitting element is directly guided onto the side of the reel for the rotation and the detection of the reel by using the light guiding member for conducting the leading and entraining end detection of the magnetic tape. The rotation of the reel is detected by intermittent screening of the light by one portion of the reel through the rotation of the reel. Since the light of the light emitting element is guided downwards by way of the upward portion from the downwards of the chassis deck, the rotation and detection can be conducted by the use of the light transmitting portion or the light screening portion provided on the reel on the chassis deck. Thus, despite the provision of the light emitting element and the light receiving element under the chassis deck, the specific light guiding member for rotation and detection use, the sensor gear, and further the intermediate gear are removed from the side of the reel rotation and detection mechanism.

DESCRIPTION OF A PREFERRED EMBODIMENT

The embodiment of this invention will be described hereinafter referring to the drawings. FIG. 1 is a schematic configuration view of a reel rotation and detection mechanism of the embodiment of this invention.

A reel rotation and detection mechanism 60 of the embodiment of this invention detects the rotation of the reel 10 supported rotatably on a deck chassis 20 of a video cassette deck. The reel rotation and detection mechanism 60 is comprised of a light emitting element 61 and a light receiving element 62 engaged on a main substrate 30 provided below the deck chassis 20, and a light guiding member 63 mounted on the deck chassis 20.

The reel 10 can be either for feeding or taking-up use. Here it is to detect the rotation of the feeding reel.

Figure 4:
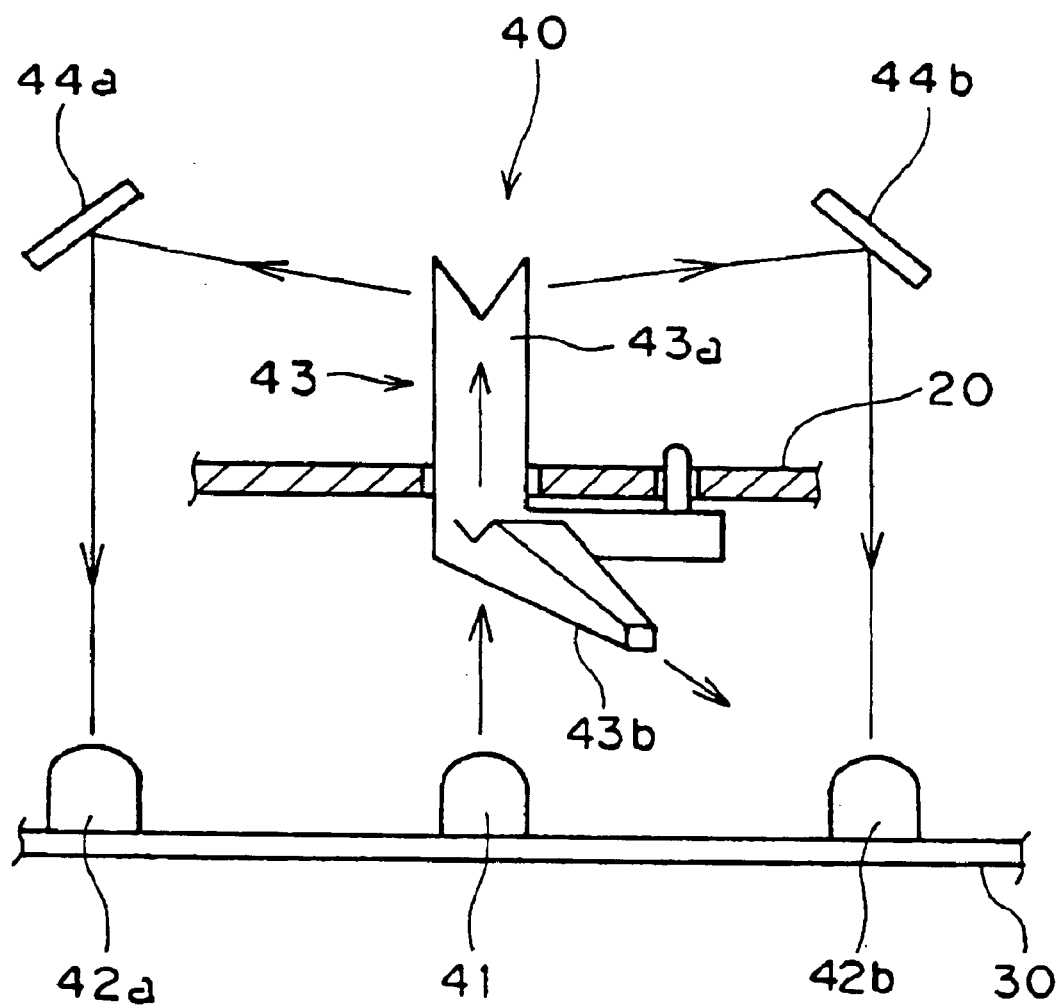
FIG. 4 is a schematic construction and elevational view of a leading and entraining end detection mechanism of the magnetic tape in accordance with the invention.
Figure 5:
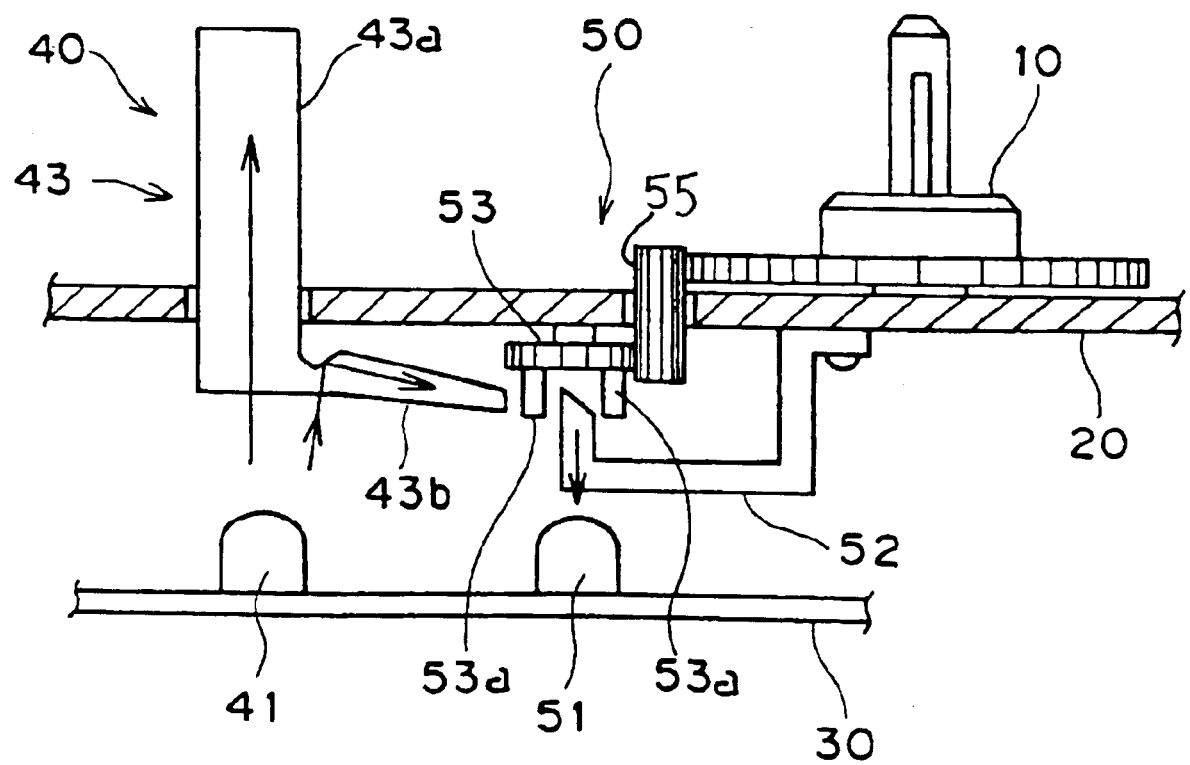
FIG. 5 is a schematic construction and elevational view of a conventional reel rotation and detection mechanism using one portion of the leading and entraining end detection mechanism of the magnetic tape of FIG. 4 in accordance with the present invention.

The light emitting element 61 and the light guiding member 63 are sharing parts to be commonly used between the leading end and the trailing end detecting mechanism of the magnetic tape corresponding to the light emitting element 41 and the light guiding member 43 shown in FIG. 4 and FIG. 5. A specific parts for detecting the rotation is a light receiving element 62. This light receiving element 62 is, for example, a photo transistor for receiving the light emitted from the light emitting element 61 such as infrared LED or the like, and is engaged upwardly, together with the light emitting element 61, on the main substrate 30.

The light guiding member 63 is a prism having a pillar portion 63a extending through the deck chassis 20, a branch portion 63b extended sideways from the middle stage portion of the pillar 63a, and a mounting portion 63c extended sideways from the pillar portion 63a for mounting the light guiding member 63 on the deck chassis 20.

The pillar portion 63a of the light guiding member 63, provided vertically upwards of the light emitting element 61, divides the light onto both the sides with its tip end portion incident from the light emitting element 61 for the leading and entraining ends of the magnetic tape as before (see FIG. 4).

The branch portion 63b to be used in the rotation and detection of the reel 10 guides sideways one portion of the light incident into the pillar portion 63a to output it immediately under from the tip end portion. The branch portion 63b is above the deck chassis 20 to directly guide the light to the reel 10 on the deck chassis 20, with the tip end portion being opposed from above to the outer peripheral portion of the reel 10.

A disk portion 13 is provided in the lower portion of the reel 10, and an opening portion 11 as a light transmitting portion is provided in the disc portion 13. The opening portion 11 is to pass immediately under the tip end portion of the branch 63b, through the rotation of the reel 10. An opening portion 21 for light transmission use is provided in the deck chassis 20 immediately under of the tip end portion of the branch portion 63b.

The light receiving element 62 is just under the opening portion 21 of the deck chassis 20, and opposes to the tip end portion of the branch portion 63b through the opening portion 21.

Although not shown in FIG. 1, the light receiving elements 42a and 42b for the leading end and entraining end detecting use are engaged on the main substrate 30 as in the leading and entraining end detecting mechanism 40 of the magnetic tape of FIG. 4. In order to guide to the light receiving elements 42a and 42b the light divided onto both the sides by the tip end portion of the pillar portion 63a of the light guiding member 63 are provided reflection plates 44a and 44b above the deck chassis 20.

The function of the reel rotation and detection mechanism 60 of the embodiment of this invention will be described.

When the light emitting element 61 emits its light, the light passes through the pillar portion 63a of the light emitting member 63 and is divided to both the sides by the tip end portion. The lights are used in the leading and entraining end detection of the magnetic tape as above described.

One portion of the light incident into the light guiding member 63 is branched for the branch portion 63b. The light is illuminated from just above into the outer peripheral portion of the rotating reel 10 from the tip end portion of the branch 63b. An opening portion 11 is provided in the outer peripheral portion of the reel 10. An opening portion 21 is provided, in the deck chassis 20, just under the tip end portion of the branch portion 63b.

Thus, the light incident from the tip end portion of the branch portion 63b passes the opening portions 11 and 21 each time the opening portion 11 reaches just under the tip end portion of the branch portion 63b through the rotation of the real 10 and reaches the light receiving element 62.

On the side of the reel rotation and detection mechanism 60 is detected the rotation of the reel 10, even when not provided a specific light guiding member 52 for rotation and detection use, a sensor gear 53, and an intermediate gear 54 as shown in FIG. 5, as they are provided.

In the embodiment, a light path reaching to the light receiving element 62 from the branch portion 63b of the light conducting member 63 is constructed as the opening portion 11 provided in the reel 10 crosses it. The reel 10 can be rotated and detected likewise by provision of a projection like light screening portion, instead of the opening portion 11, on the outer peripheral portion of the reel 10.

In the embodiment, this invention is not restricted to the light emitting element 61 and the light receiving element 62, which are described on the main substrate 30 provided under the deck chassis. The light emitting element 61 and the light receiving element 62 can be engaged with a different component of another substrate of, for example, a main substrate 30. Either member to be engaged with the light emitting element 61 and the light receiving element 62 should be determined in relation to surrounding space or the like.

As described above, in the reel rotation and detection mechanism of the video cassette deck of this invention, the light from the light emitting element is guided downwards by way of the above from under the deck chassis by using the light guiding member for conducting the leading, entraining end detection of the magnetic tape to detect the rotation of the reel on the deck chassis. Despite the provision of the light emitting element and the light receiving element under the deck chassis, the specific light guiding member for rotation and the detection from the side of the reel rotation and detection mechanism, the sensor gear, and further the intermediate gear are removed. Thus, the wiring construction is simplified and the item of the components is considerably reduced in number as compared with the conventional reel rotation and detection mechanism. Thus, the reel rotation and detection mechanism, and the video cassette tape deck can be reduced in manufacturing cost.

In the reel rotation and detection mechanism of the video cassette deck of this invention, the construction of an opening portion for light transmission where the deck chassis transmits the light downwards from above guides the light with short distance downwards from above of the deck chassis, consequently the reel rotation and detection mechanism is down-sized.

In the reel rotation and detection mechanism of the video cassette deck of this invention, the light guiding member has a pillar portion extending through the deck chassis to guide the light coming from the light emitting element into the cassette on the deck chassis, and a branch portion extending sideways from the pillar portion to illuminate the light to the light receiving element, the branch portion being positioned above the deck chassis and opposite to the light passing portion or the light screening portion provided in the reel on the deck chassis to simplify the light conducting member to particularly reduce the number of the components. The light path from the light emitting element to the light receiving element becomes short to make the reel rotation and detection mechanism small in size.

In the reel rotation and detection mechanism of the video cassette deck of this invention, the light passing portion or the light screening portion is provided in the disk portion provided integrally on the reel, the branch portion of the light guiding member is opposite from above to the light passing portion or the light screening portion so that the light path from the light emitting element to the light receiving element become much shorter and the reel rotation and detection mechanism is made particularly small in size.

In the reel rotation and detection mechanism of the video cassette deck of this invention, the light emitting element and the light receiving element are engaged on the substrate provided under the deck chassis to simplify the lower construction of the deck chassis.

In the reel rotation and detection mechanism of the video cassette deck of this invention, the light receiving element for leading and entraining end detecting use for receiving the light guided into the cassette to detect the leading and entraining ends of the magnetic tape is provided under the deck chassis, and a reflection plate for reflecting the light downwards from above the deck chassis is provided above the deck chassis so as to simplify the wiring construction or the like even in the leading and entraining end detecting mechanism of the magnetic tape.

In the reel rotation and detection mechanism of the video cassette deck of this invention, a light receiving element for detecting the leading and entraining ends, together with the light emitting element and the light receiving element, are engaged with on the substrate under the deck chassis so as to simplify the construction under the deck chassis.

What is claimed is:

1. A reel rotation and detection mechanism for a video cassette deck comprising:

a light emitting element for emitting light used to detect at least the leading end and the entraining end of a magnetic tape within a cassette arranged within the video cassette deck;

a light guiding member for guiding the light from the light emitting element into the cassette for detecting the leading and entraining ends of a magnetic tape, and for directly guiding a portion of the light onto the side of the reel for detection of the reel;

at least a first light receiving element for receiving the light guided onto the side of the reel;

a light passing portion and a light screening portion provided on the reel so as to cross the light path reaching from the light guiding member to the first light receiving element through the rotation of the reel;

the light emitting element and the first light receiving element are provided under a deck chassis for mounting main components including the reel of the video cassette deck; and the light guiding member guiding at least the light from the light emitting element below the deck chassis to a point above the deck chassis and thereafter to the first light receiving element under the deck chassis by way of the light passing portion provided on the reel when aligned with an opening portion on the deck chassis.

2. A reel rotation and detection mechanism for a video cassette deck according to claim 1, wherein:

the deck chassis has an opening portion for light transmission for transmitting the light towards the first light receiving element.

3. A reel rotation and detection mechanism for a video cassette deck according to claim 1, wherein:

the light guiding member has a pillar portion extending through the deck chassis to guide the light coming from the light emitting element into the cassette on the deck chassis, and a branch portion extending sideways from the pillar portion to guide the light to the at least first light receiving element, the branch portion being positioned above the deck chassis and opposite to the light passing portion and the light screening portion provided on the reel on the deck chassis.

4. A reel rotation and detection mechanism for a video cassette deck according to claim 2, wherein:

the light guiding member has a pillar portion extending through the deck chassis to guide the light coming from the light emitting element into the cassette on the deck chassis, and a branch portion extending sideways from the pillar portion to illuminate the light to the at least first light receiving element, the branch portion being positioned above the deck chassis and opposite to the light passing portion and the light screening portion provided on the reel on the deck chassis.

5. A reel rotation and detection mechanism for a video cassette deck according to claim 1, wherein;

the light passing portion and the light screening portion is provided on a disk portion provided integrally on the reel; and the branch portion is opposite from above the light passing portion and the light screening portion.

6. A reel rotation and detection mechanism for a video cassette deck according to claim 2, wherein;

the light passing portion and the light screening portion is provided on a disk portion provided integrally on the reel; and the branch portion is opposite from above the light passing portion and the light screening portion.

7. A reel rotation and detection mechanism for a video cassette deck according to claim 3, wherein:

the light passing portion and the light screening portion is provided in a disk portion provided integrally on the reel; and the branch portion is at least partially coextensive with the light passing portion and the light screening portion.

8. A reel rotation and detection mechanism for a video cassette deck according to claim 4, wherein:

the light passing portion and the light screening portion is provided in a disk portion provided integrally on the reel; and the branch portion is at least partially coextensive with the light passing portion and the light screening portion.

9. A reel rotation and detection mechanism for a video cassette deck according to claim 1, wherein:

the light emitting element and the at least first light receiving element are engaged on a substrate provided under the deck chassis.

10. A reel rotation and detection mechanism for a video cassette deck according to claim 2, wherein:

the light emitting element and the at least first light receiving element are engaged on a substrate provided under the deck chassis.

11. A reel rotation and detection mechanism for a video cassette deck according to claim 3, wherein:

the light emitting element and the light receiving element are engaged on a substrate provided under the deck chassis.

12. A reel rotation and detection mechanism for a video cassette deck according to claim 4, wherein:

the light emitting element and the light receiving element are engaged on a substrate provided under the deck chassis.

13. A reel rotation and detection mechanism for a video cassette deck according to claim 1, further comprising: at least a second light receiving element for tape end detection is provided under the deck chassis.

14. A reel rotation and detection mechanism for a video cassette deck according to claim 2, further comprising: at least a second light receiving element for tape end detection is provided under the deck chassis.

15. A reel rotation and detection mechanism for a video cassette deck according to claim 3, further comprising: at least a second light receiving element for tape end detection is provided under the deck chassis.

16. A reel rotation and detection mechanism for a video cassette deck according to claim 4, further comprising: at least a second light receiving element for tape end detection is provided under the deck chassis.

17. A reel rotation and detection mechanism for a video cassette deck according to claim 13, wherein the second light receiving element for detecting the tape, together with the light emitting element and the first light receiving element are arranged on a substrate under the deck chassis.

18. A reel rotation and detection mechanism for a video cassette deck according to claim 14, wherein the second light receiving element for detecting the tape, together with the light emitting element and the first light receiving element are arranged on a substrate under the deck chassis.

19. A reel rotation and detection mechanism for a video cassette deck according to claim 15, wherein the second light receiving element for detecting the tape, together with the light emitting element and the first light receiving element are arranged on a substrate under the deck chassis.

20. A reel rotation and detection mechanism for a video cassette deck according to claim 15, wherein the second light receiving element for detecting the tape, together with the light emitting element and the first light receiving element are arranged on a substrate under the deck chassis.

21. A reel rotation and detection mechanism for a video cassette deck comprising:

a reel rotatably mounted on a cassette deck chassis and having a disk portion generally proximate to said deck chassis provided with an opening portion for transmission of light through said disk portion;

a light emitting element for emitting light used to detect at least the leading end and the entraining end of a magnetic tape within a cassette arranged within the video cassette deck;

a light guiding member for guiding the light from the light emitting element into at least the cassette for detecting the leading and entraining ends of the magnetic tape, and for directly guiding a portion of the light onto the side of the reel for detection of the reel;

at least a first receiving element for receiving the light guided onto the side of the reel;

a light passing portion and a light screening portion provided on the reel so as to cross the light path reaching from the light guiding member to the first light receiving element through the rotation of the reel;

the light emitting element and the first light receiving element are provided under a deck chassis for mounting main components including the reel of the video cassette deck; and the light guiding member guiding the light from the light emitting element below the deck chassis to a point above the deck chassis and thereafter to the light receiving element under the deck chassis by way of the light passing portion provided on the reel when aligned with the opening portion on the deck chassis.

22. A reel rotation and detection mechanism for a video cassette deck comprising:

a video cassette deck chassis having at least a first opening therein for permitting light to pass therethrough;

a reel roratably mounted on the cassette deck chassis and having a disk portion generally proximate to the deck chassis provided with a light passing portion for transmission of light through said disk portion;

said light passing portion in said disk being arranged to selectively align said light passing portion in said disk with said first opening in said deck chassis along a direction generally normal to said deck chassis;

a light emitting element for emitting light used to detect the at least leading end and the entraining end of a magnetic tape within a cassette arranged within the video cassette deck;

at least a first light guiding member for guiding the light from the light emitting element into the cassette for detecting the leading and entraining ends of a magnetic tape, and for directly guiding a portion of the light onto the side of the reel for detection of the reel;

at least a first light receiving element for receiving the light guided onto the side of the reel;

the light passing portion and a light screening portion provided on the reel so as to cross the light path reaching from the light guiding member to the at least first light receiving element through the rotation of the reel;

the light emitting element and the at least first light receiving element are provided under a deck chassis for mounting main components including the reel of the video cassette deck; and the light guiding member guiding the light from the light emitting element below the deck chassis to a point above the deck chassis and thereafter to the at least first light receiving element under the deck chassis by way of the light passing portion provided on the reel when aligned with the at least first opening portion on the deck chassis.

* * * * *